(12) United States Patent
Lee et al.

(10) Patent No.: US 12,089,770 B2
(45) Date of Patent: Sep. 17, 2024

(54) ELECTRIC KETTLE

(71) Applicant: LG ELECTRONICS INC., Seoul (KR)

(72) Inventors: June Young Lee, Seoul (KR); Sang Ki Lee, Seoul (KR); Min Kyu Si, Seoul (KR); Dae Yong Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/586,066

(22) Filed: Jan. 27, 2022

(65) Prior Publication Data

US 2022/0240709 A1 Aug. 4, 2022

(30) Foreign Application Priority Data

Feb. 2, 2021 (KR) .......................... 10-2021-0014804
Nov. 12, 2021 (KR) .......................... 10-2021-0155356

(51) Int. Cl.
*A47J 27/21* (2006.01)
*A47J 27/212* (2006.01)

(52) U.S. Cl.
CPC ... *A47J 27/21008* (2013.01); *A47J 27/21175* (2013.01); *A47J 27/21191* (2013.01); *A47J 27/212* (2013.01); *A47J 2203/00* (2013.01)

(58) Field of Classification Search
CPC ............ A47J 27/21008; A47J 27/21175; A47J 27/21191; A47J 2203/00; A47J 27/212
USPC ............................................................ 99/340
See application file for complete search history.

(56) References Cited

U.S. PATENT DOCUMENTS

| 1,415,456 | A | * | 5/1922 | Lauth | ....................... H05B 6/00 |
| | | | | | 219/50 |
| 1,530,416 | A | * | 3/1925 | Saeki | .................... A47J 37/015 |
| | | | | | 219/415 |
| 3,716,169 | A | * | 2/1973 | Chivers | ................. A47J 31/053 |
| | | | | | 220/663 |
| 6,172,341 | B1 | * | 1/2001 | Hoffmann | .......... A47J 27/21175 |
| | | | | | 219/441 |
| 2007/0221650 | A1 | * | 9/2007 | De Oliveira | ............ A47J 36/36 |
| | | | | | 219/386 |
| 2011/0259871 | A1 | * | 10/2011 | Li | ........................ H05B 1/0269 |
| | | | | | 219/441 |

(Continued)

FOREIGN PATENT DOCUMENTS

| CN | 1698505 | A | * | 11/2005 | ............ A47J 27/212 |
| CN | 111121918 | A | * | 5/2020 | ........ A47J 27/21008 |

(Continued)

*Primary Examiner* — Jimmy Chou
(74) *Attorney, Agent, or Firm* — Bryan Cave Leighton Paisner LLP

(57) ABSTRACT

Proposed is an electric kettle in which a main body is provided with a water level window. The electric kettle of the present disclosure includes the main body configured to receive water or food therein and provided with the water level window through which the level of water contained inside the main body is seen, a lid provided on an open upper side of the main body so as to cover the open upper side of the main body, and a base provided at a lower side of the main body so as to support the main body, wherein a flow path in which a fluid flows is formed in the water level window and has a bottom surface formed to be inclined. According to such a configuration, a fluid remaining inside the water level window decreases.

16 Claims, 23 Drawing Sheets

(56) References Cited

U.S. PATENT DOCUMENTS

| | | | | |
|---|---|---|---|---|
| 2011/0265562 A1* | 11/2011 | Li | .......................... | A47J 27/212 |
| | | | | 73/304 C |
| 2012/0145698 A1* | 6/2012 | Von Seidel | ....... | A47J 27/21016 |
| | | | | 219/438 |
| 2020/0037806 A1* | 2/2020 | Farhamandfar | .... | A47J 27/21191 |

FOREIGN PATENT DOCUMENTS

| | | | | |
|---|---|---|---|---|
| DE | 9115907 U1 | | 2/1992 | |
| DE | 29513124 U1 | * | 8/1995 | ........ A47J 27/21008 |
| DE | 29515913 U1 | * | 2/1997 | ........ A47J 27/21008 |
| GB | 2251546 A | * | 7/1992 | ........ A47J 27/21166 |
| GB | 2337194 A | | 11/1999 | |
| WO | 9827851 A1 | | 7/1998 | |

* cited by examiner

ELECTRIC KETTLE

CROSS REFERENCE TO RELATED APPLICATION

The present application claims priority to Korean Patent Application Nos. 10-2021-0014804 and 10-2021-0155356, filed Feb. 2, 2021 and Nov. 12, 2021, respectively, the entire contents of which are incorporated herein for all purposes by this reference.

BACKGROUND OF THE INVENTION

Field of the Invention

The present disclosure relates generally to an electric kettle. More particularly, the present disclosure relates to an electric kettle in which the bottom surface of a flow path provided in a water level window of a main body is configured to be inclined.

Description of the Related Art

Generally, an electric kettle refers to a device that heats water received in a main body by a heating means such as a heater by supplying electricity to the electric kettle.

Furthermore, for such an electric kettle, the main body is generally configured to be detachable from a base to which power is supplied such that the main body is heated while seated on the base, and can be used by holding a handle and lifting the main body away from the base. The electric kettle of this type is usually called as various names such as a cordless electric kettle, cordless electric pot, and coffee pot.

For such an electric kettle, the main body has a complicated shape, and accordingly, in order to facilitate the arrangement of the configuration of the main body, there are cases in which the main body is made of a plastic material. During the long-term use of the main body, harmful components of plastic or microplastic may be dissolved in hot water, and the main body is also vulnerable to scratching, which may contaminate the inside of the main body.

In addition, when the main body is made of glass, the electric kettle is hygienic and has a very good appearance, but may be damaged due to impact. Furthermore, the electric kettle is heavy and inconvenient to be used and is not easy to be molded.

Recently, the main body is made of stainless steel, and a cordless electric pot capable of heating water contained therein has also been disclosed. In such a structure, the main body is made of a stainless material and thus is very hygienic and has excellent durability.

Furthermore, a water level window is also provided to check the content of the main body or the level of the content. That is, in an electric kettle disclosed in UK Patent No. GB2337194B and German Utility Model Registration No. DE29513124U1, a water level window is provided in the main body of the electric kettle such that the level of content contained therein can be seen from the outside.

However, in such conventional technologies, the water level window is difficult to be coupled to the main body and partially protrudes toward the outside of the main body or the inside thereof, so the electric kettle is inconvenient to be used.

In addition, in the conventional technologies, after a content contained in the main body is withdrawn to the outside, the content partially remains in the water level window and is contaminated or is difficult to be cleaned.

DOCUMENTS OF RELATED ART (Patent Document 1) UK Patent No. GB2337194B
(Patent Document 2) German Utility Model Registration No. DE29513124U1

SUMMARY OF THE INVENTION

Accordingly, the present disclosure has been made to solve the above problems occurring in the related art, and the present disclosure is intended to propose an electric kettle which is provided with a water level window which can be assembled with the outside of a main body.

In addition, the present disclosure is intended to propose an electric kettle in which the amount of content can be recognized from the outside through a flow path formed in the water level window.

Furthermore, the present disclosure is intended to propose an electric kettle in which the bottom surface of the flow path formed in the water level window is configured to be inclined.

Additionally, the present disclosure is intended to propose an electric kettle in which the surface stress of the flow path formed in the water level window is reduced to prevent water from accumulating therein.

In addition, the present disclosure is intended to propose an electric kettle in which the water level window is prevented from protruding to the outside and inside of the main body.

In order to achieve the above objectives, according to one aspect of the present disclosure, an electric kettle of the present disclosure is provided with a water level window including an outer cover and an inner cover.

In the electric kettle of the present disclosure, a flow path in which water flows may be formed between the outer cover and the inner cover constituting the water level window.

In the electric kettle of the present disclosure, the water level window may be provided with the flow path configured to guide the vertical flow of a fluid and an entrance flow path communicating the flow path with a main body.

In the electric kettle of the present disclosure, the bottom surface of the flow path or the entrance flow path formed in the water level window may be configured to be inclined. Accordingly, the amount of fluid remaining in the water level window may decrease.

In the electric kettle of the present disclosure, a corner angle formed between the surface of the entrance flow path formed in the water level window and the surface of the flow path of the water level window may be configured to have the curvature of zero degrees.

In the electric kettle of the present disclosure, the outer cover constituting the water level window may be made to be transparent, and the inner cover may be made to be opaque.

In the electric kettle of the present disclosure, the outer cover and the inner cover constituting the water level window may be coupled to each other by fusion.

In the electric kettle of the present disclosure, a packing may be provided between the water level window and the main body for airtightness.

The electric kettle of the present disclosure may include the main body configured to receive water or food therein and provided with the water level window through which a water level inside the main body is seen, a lid provided on the open upper side of the main body so as to cover the open upper side of the main body, and a base provided at the lower side of the main body so as to support the main body, wherein the flow path in which a fluid flows may be formed in the water level window and may have a bottom surface formed to be inclined.

The water level window may include the inner cover and the outer cover configured to have shapes corresponding to each other to be coupled to each other, and the flow path may be formed between the inner cover and the outer cover.

The bottom surface of the flow path may have a downward inclination relative to the main body.

An inner inclined surface and an outer inclined surface may be formed on the inner cover and the outer cover, respectively, so as to guide the flow of a fluid contained in the flow path into the main body.

The inner inclined surface and the outer inclined surface may be configured to have the same inclinations.

An end of the inner inclined surface and an end of the outer inclined surface may have the same heights to be in close contact with each other.

The water level window may have the entrance flow path provided on each of upper and lower end parts thereof, the entrance flow path connecting the flow path formed inside the water level window with the inside of the main body.

The bottom surface of the entrance flow path formed in the lower end part of the water level window may be configured to be inclined.

The entrance flow path formed in the lower end part of the water level window may include an entrance flow path groove formed by being depressed therefrom.

The bottom surface of the entrance flow path groove may be the inner inclined surface.

The entrance flow path may be formed in each of the upper and lower end parts of the inner cover.

The entrance flow path may be configured to be perpendicular to the flow path.

The corner angle formed between the surface of the flow path and the surface of the entrance flow path may have curvature of zero degrees.

A corner angle formed between the surface of the entrance flow path and the outer surface of the inner cover may have curvature of zero degrees.

A corner angle formed between the surface of the entrance flow path formed in the upper end part of the inner cover and the outer surface of the inner cover may a curvature larger than curvature of zero degrees, and a corner angle formed between the surface of the entrance flow path formed in the lower end part of the inner cover and the outer surface of the inner cover may have curvature of zero degrees.

The length of the entrance flow path groove may be shorter than the length of the entrance flow path formed in the lower end part of the water level window.

The inner end of the entrance flow path groove may be located at a side outer than the inner end of the inner cover.

The packing may be provided between the inner cover and the main body so as to block a gap therebetween.

The inner end of the entrance flow path groove may be located at a side outer than the inner end of the packing.

The water level window may include an inner part and an outer part configured to be integrated with each other, and the flow path may be formed between the inner part and the outer part.

The entrance flow path may be provided in each of the upper and lower parts of the water level window, the entrance flow path connecting the flow path formed inside the water level window with the inside of the main body.

The main body may be configured as a double structure such that the main body includes an inner body constituting the inner appearance of the main body and an outer body constituting the outer appearance of the main body, and the water level window may include the inner cover made to be opaque and coupled to the inner body and the outer cover made to be transparent and coupled to the outer body.

The flow path in which a fluid can flow may be formed between the inner cover and the outer cover, and the inner cover and the outer cover may be coupled to each other by fusion.

The water level window may be mounted to the main body by being press-fitted thereto from the outside, and the inner cover or the outer cover may be made of a tritan material.

The electric kettle of the present disclosure may have the following effects.

First, the main body of the electric kettle according to the present disclosure may be provided with the water level window in which the flow path is formed to communicate with the inner space of the main body. Accordingly, a water level corresponding to the level of water contained inside the main body may be displayed on the water level window, thereby enabling the amount of the water contained inside the electric kettle to be easily recognized from the outside.

Second, according to the present disclosure, the edges of the outer cover and the inner cover constituting the water level window may be coupled to each other by fusion, thereby facilitating and securing the coupling of the outer cover to the inner cover.

Third, according to the present disclosure, in the outer cover and the inner cover constituting the water level window, the inner cover may be made to be opaque. Accordingly, an inner hole and an inner edge formed in the inner body may not be seen from the outside, thereby making the overall appearance of the electric kettle neat and beautiful.

Fourth, according to the present disclosure, a cover hook may be provided on the outer cover of the water level window to be held in the outer body. Accordingly, when the water level window is pushed from the outside of the main body, the assembly of the water level window with the main body may be completed. Accordingly, according to the present disclosure, the assembly of the water level window may be easy.

Fifth, according to the present disclosure, the edge of the outer hole of the outer body may be burred inward, and the edge of the inner hole of the inner body may be burred outward. Accordingly, the amount of the water level window protruding to the outer or inner surface of the main body may relatively decrease to prevent any interference. That is, the size of the upper end of the water level window protruding to the inside of the main body may decrease, thereby decreasing the interference of a user's fingers with the water level window when cleaning the inside of the main body and decreasing the interference of food with the water level window.

Sixth, according to the present disclosure, a fusion part and a fusion groove having shapes corresponding to each other may be formed respectively on the outer cover and the inner cover constituting the water level window. Accordingly, the outer cover and the inner cover may be coupled and fused to each other at a precise position due to the fusion part and the fusion groove, thereby improving work efficiency.

Seventh, according to the present disclosure, the water level window may be made of a tritan material, which is an eco-friendly material. Accordingly, the flow path formed inside the water level window may be seen from the outside and due to the eco-friendly material, the water level window may not cause environmental pollution and may be harmless to the human body.

Eighth, according to the present disclosure, the bottom surface of the flow path formed in the water level window may be configured to be inclined. Accordingly, a fluid introduced into the water level window, such as water, may be easily restored to the main body.

Ninth, according to the present disclosure, a corner angle formed between the surface of the entrance flow path formed in the lower end part of the inner cover of the water level window and the outer surface of the inner cover may have no curvature. That is, the corner angle formed between the surface of the entrance flow path and the outer surface of the inner cover may be configured to have the curvature of zero degrees. Accordingly, the amount of a fluid attached to the corner angle formed between the surface of the entrance flow path and the outer surface of the inner cover may decrease, thereby preventing contamination due to a fluid or food remaining in the water level window and facilitating cleaning after the use of the electric kettle.

Tenth, according to the present disclosure, the bottom surface of the flow path formed inside the water level window may be configured to be inclined and an inner portion of the bottom surface of the flow path may be cut to minimize the formation of water droplets due to the surface stress of the flow path. Accordingly, according to the present disclosure, due to the partial cutting and inclination of the bottom surface of the water level window, water droplets may move downward due to gravity, thereby decreasing the amount of water remaining in the water level window after pouring water contained in the main body to the outside.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, an electric kettle of the present disclosure will be described in detail with reference to the accompanying drawings.

Figure 1:
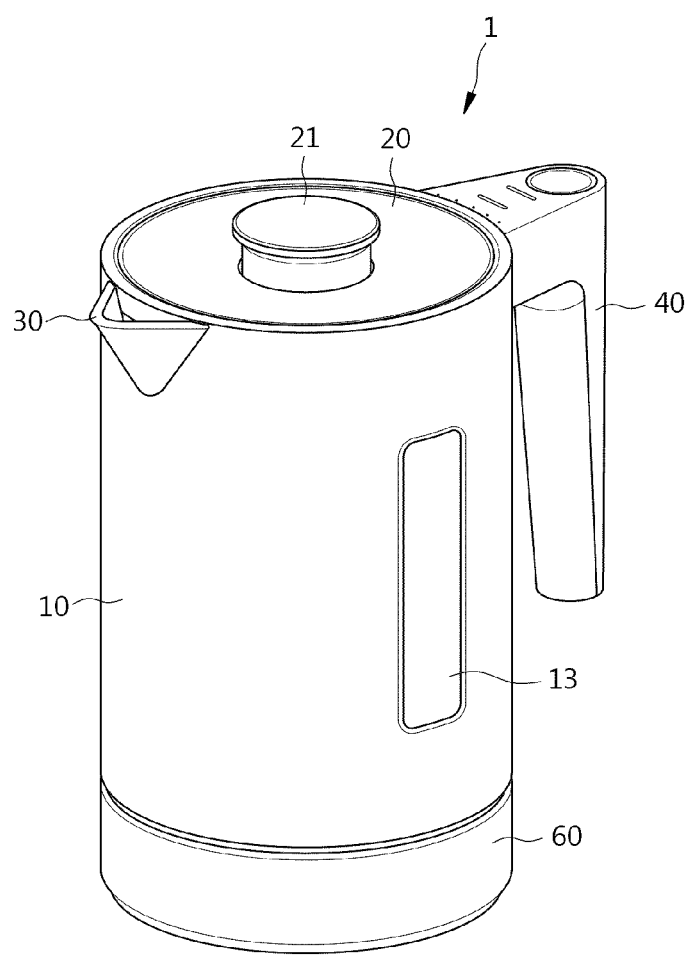
FIG. 1 is a perspective view illustrating the configuration of an electric kettle according to the exemplary embodiment of the present disclosure.
Figure 2:
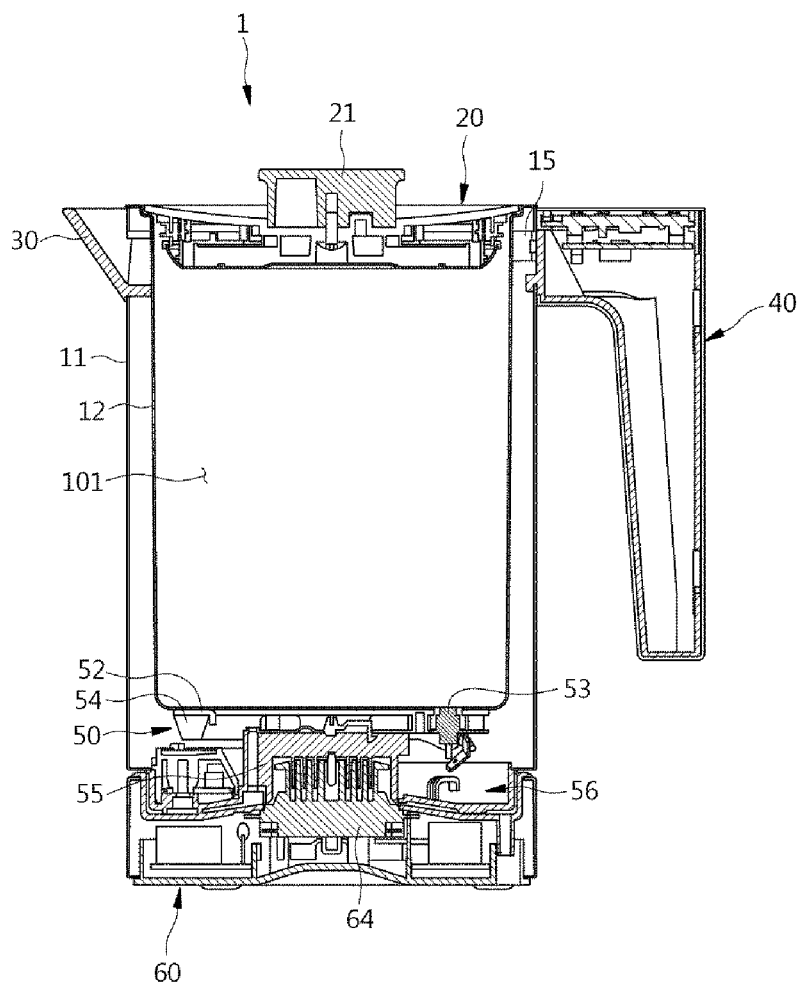
FIG. 2 is a vertical sectional view illustrating the inner configuration of the electric kettle of the present disclosure.
Figure 3:
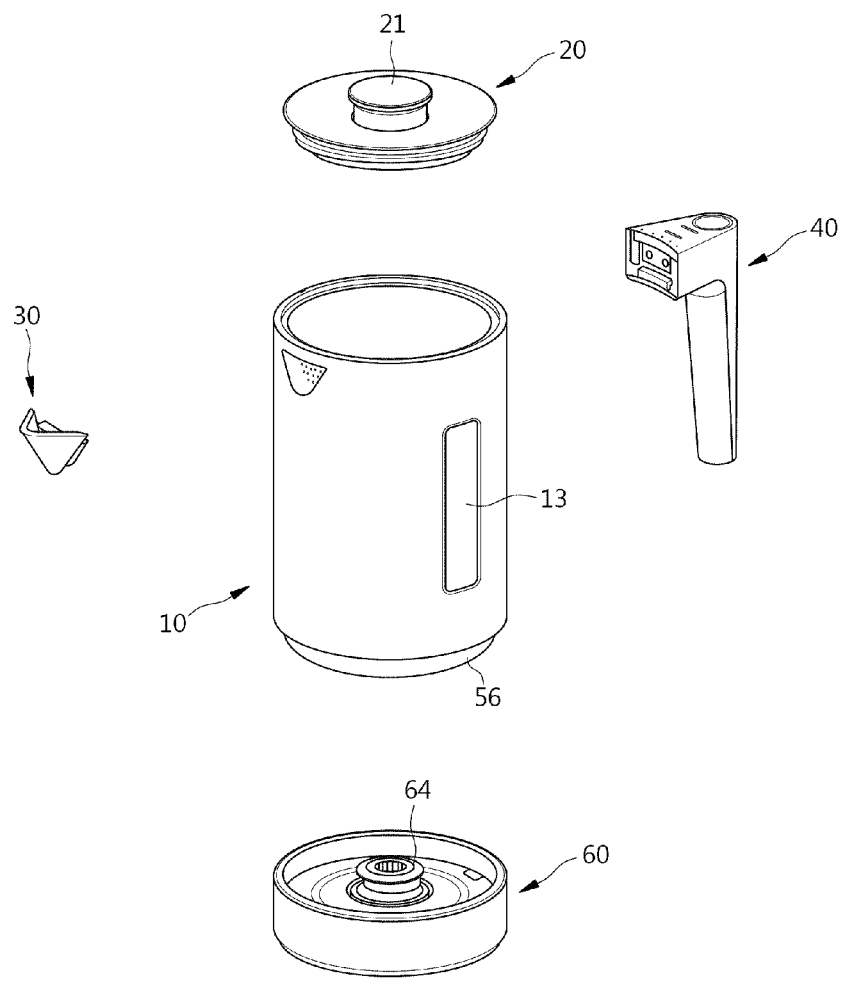
FIG. 3 is an exploded perspective view illustrating the configuration of the electric kettle of the present disclosure.
Figure 4:
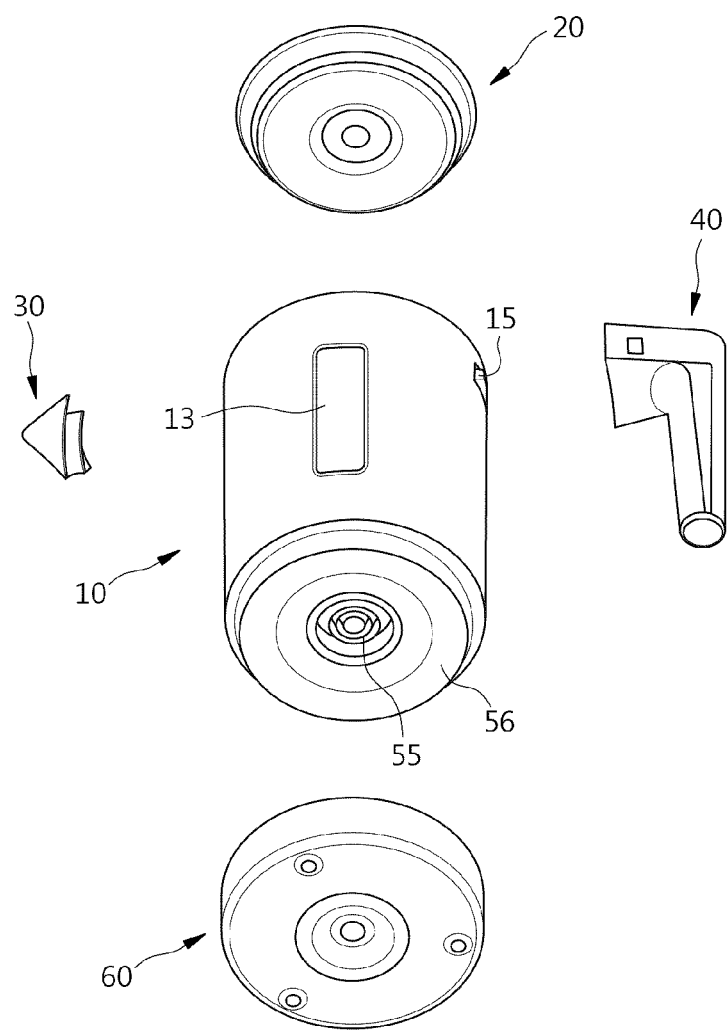
FIG. 4 is an exploded perspective view illustrating the configuration of the electric kettle of the present disclosure when the electric kettle is viewed from a lower side thereof.

FIGS. 1 to 4 illustrate the configuration of the electric kettle according to an embodiment of the present disclosure. That is, FIGS. 1 and 2 respectively illustrate a perspective view and a vertical sectional view illustrating the configuration of the electric kettle according to the embodiment of the present disclosure, and FIGS. 3 and 4 illustrate exploded perspective views of the electric kettle illustrated in FIG. 1 when the electric kettle is viewed respectively from upper and lower sides thereof.

As illustrated in these drawings, the electric kettle 1 according to the embodiment of the present disclosure may include a main body 10 configured to receive water or food therein, a lid 20 configured to cover an open upper side of the main body 10, a base 60 provided at a lower side of the main body 10 so as to support the main body 10, a spout 30 provided on the upper end of the main body 10 and configured to guide the discharge of water or food contained inside the main body 10, and a handle 40 coupled to the upper end of the main body 10 and configured to be held by hand.

Specifically, the electric kettle 1 according to the embodiment of the present disclosure may be formed in a cylindrical shape as a whole, and may be composed of the main body 10 configured to receive water or food therein, the lid 20 configured to cover the open upper side of the main body 10, the handle 40, a heating module 50, and the base 60.

The main body 10 may be formed in a cylindrical shape having an open upper surface. Accordingly, the upper surface of the main body 10 may be covered by the lid 20.

The handle 40 may be configured to protrude outward from a side of the main body 10. That is, as illustrated in FIG. 2, the handle 40 may be provided to protrude to the right side of the upper end of the main body 10.

The electric kettle may have the base 60 disposed on a bottom surface thereof and may receive external power due to a power cord connected to the base 60.

Furthermore, the assembled main body 10 may be seated on the upper surface of the base 60.

The main body 10 may be formed in a cylindrical shape and may have a heating space 101 in which water is received and heated. Furthermore, the main body 10 may be supplied with power while seated on the base 60.

Power may be supplied to the base 60 and the main body 10 by the contact of a power terminal therewith. In addition, power may be supplied to the base 60 and the main body 10 in an electromagnetic induction method.

To this end, the base 60 may be provided with a lower power module 64 which functions as a first coil, and the main body 10 corresponding to the base 60 may be provided with an upper power module 55 which functions as a second coil.

The heating module 50 and a bottom cover 56 may be mounted to the lower end of the main body 10 and may constitute a portion of the lower part of the main body 10, and thus may be referred to as "a lower main body".

The heating module 50 may include a heating plate 52 which constitutes the bottom surface of the inside of the main body 10 or is configured to be in close contact with the bottom surface of the main body 10, and a heater 54 configured to heat the heating plate 52, wherein the heating plate 52 may be heated by power supplied from the upper power module 55. Furthermore, the heating module 50 may include the bottom cover 56 constituting the lower surface of the main body 10.

The spout 30 may be formed on an end of the main body 10 by protruding outward therefrom such that water inside the main body 10 can be poured out.

The handle 40 may be mounted at a side opposite to the spout 30. That is, as illustrated in the drawing, the handle 40 may be provided on the right surface of the main body 10, and the spout 30 may be provided on the left surface of the main body 10. Accordingly, a user may easily pour water through the spout 30 while holding the handle 40 in his or her hand.

Meanwhile, the handle 40 may be mounted to an outer surface of a side (the right side in the drawing) of the main body 10.

The handle 40 is a part gripped by a user's hand such that the user easily raises or moves the electric kettle 1, and may include a decoration part and an elastic grip part. That is, the handle 40 may have a luxurious exterior and may be made of rubber or silicone in at least a portion (the grip part, etc.) thereof such that a user's hand is prevented from slipping when the user holds the handle 40.

In addition, the handle 40 may be provided with a button through which a user can perform an on/off manipulation or a temperature control. To this end, a PCB may be provided inside the handle 40, and the upper surface of the handle 40 may be configured to display the operation state of the electric kettle 1.

It is preferable that the main body 10 is configured as a double structure. That is, the main body 10 may be composed of an outer body 11 constituting the outer appearance of the main body 10 and an inner body 12 constituting the inner appearance of the main body 10.

The handle 40 may be configured to be coupled to the upper end of the inner body 12. That is, the inner body 12 may be provided with a handle bracket 15 and may be configured such that the handle 40 is fixed to the inner body 12. Furthermore, the handle bracket 15 may be attached and fixed to the outer surface of the inner body 12 by welding or an adhesive.

The open upper surface of the electric kettle 1, that is, the upper surface of the main body 10 may be covered by the lid 20.

While the lid 20 is closed, the lid 20 may constitute the upper surface of the electric kettle 1 and may seal the inside of the electric kettle 1 in contact with the circumference of the upper end of the main body 10.

A cap 21 may be formed on the center portion of the lid 20 by protruding upward therefrom. The cap 21 allows a user to easily raise the lid 20 or to conveniently couple the lid 20 to the main body 10.

Furthermore, the handle bracket 15 may be attached or fixed to the upper end of the inner body 12 and may be configured such that the handle 40 is coupled to the main body 10 by a fastening bolt.

In addition, a temperature sensor 53 may be provided on the lower surface of the inner body 12 so as to measure the temperature of water contained inside the heating space 101.

The main body 10 may have a water level window 13 formed therein. The water level window 13 allows the water level of the inside of the electric kettle 1 to be checked from the outside of the electric kettle 1 without opening the lid 20.

The water level window 13 may extend to be long in a vertical direction and may be mounted to each of the inner body 12 and the outer body 11.

Figure 7:
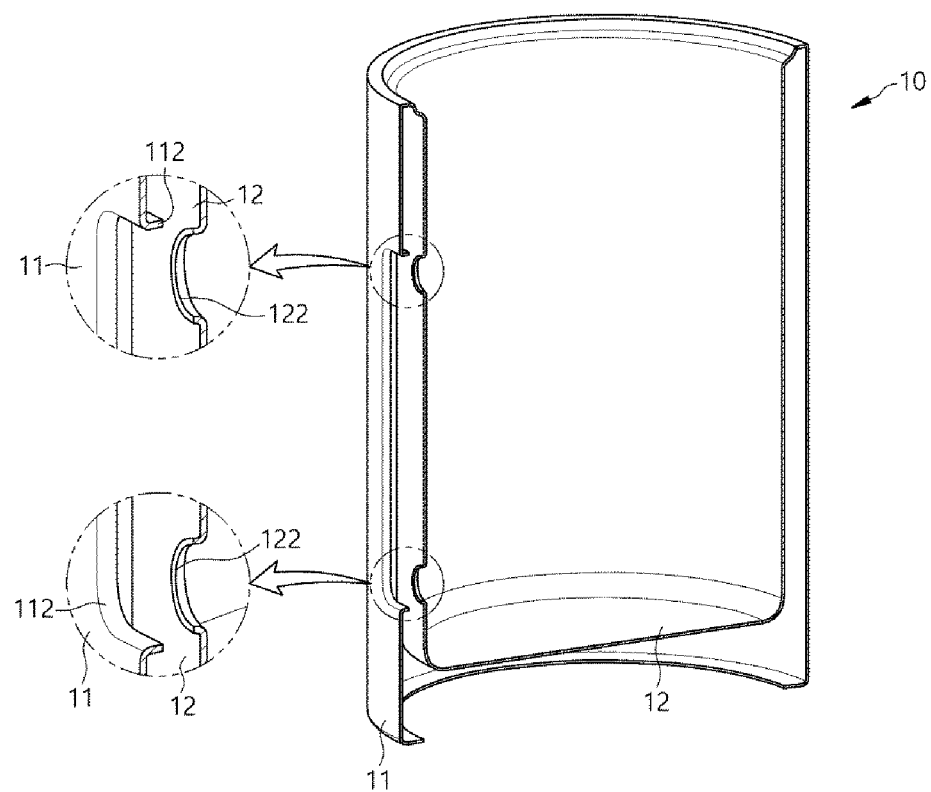
FIG. 7 is a cut-away perspective view of the main body constituting the electric kettle according to the embodiment of the present disclosure.
Figure 8:
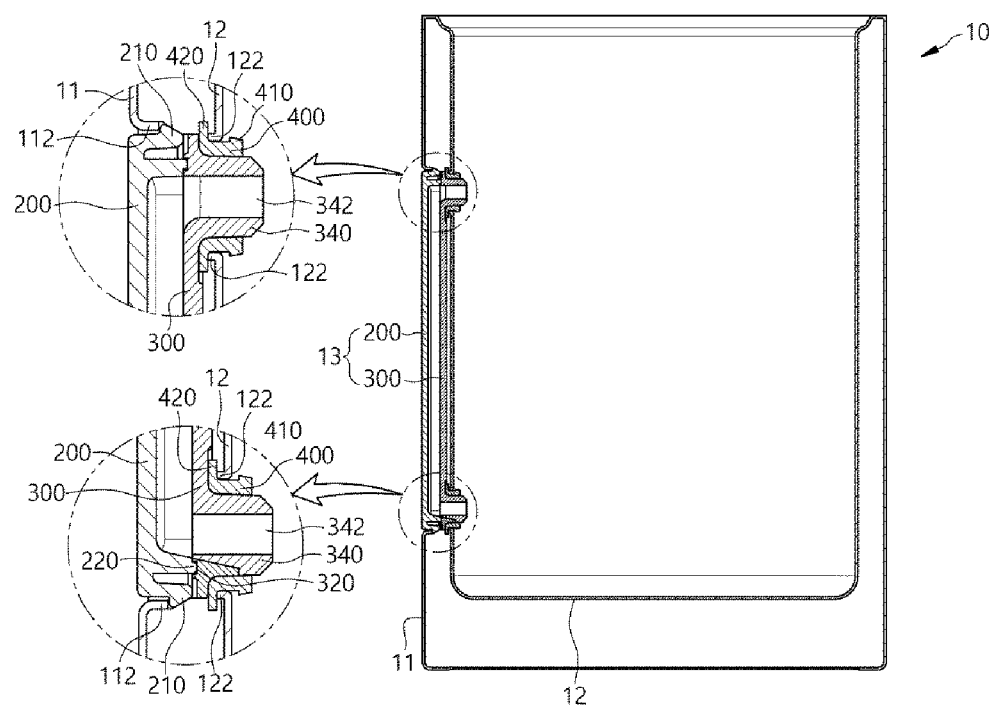
FIG. 8 is a vertical sectional view illustrating a state in which the water level window is coupled to the main body constituting the electric kettle according to the embodiment of the present disclosure.
Figure 9:
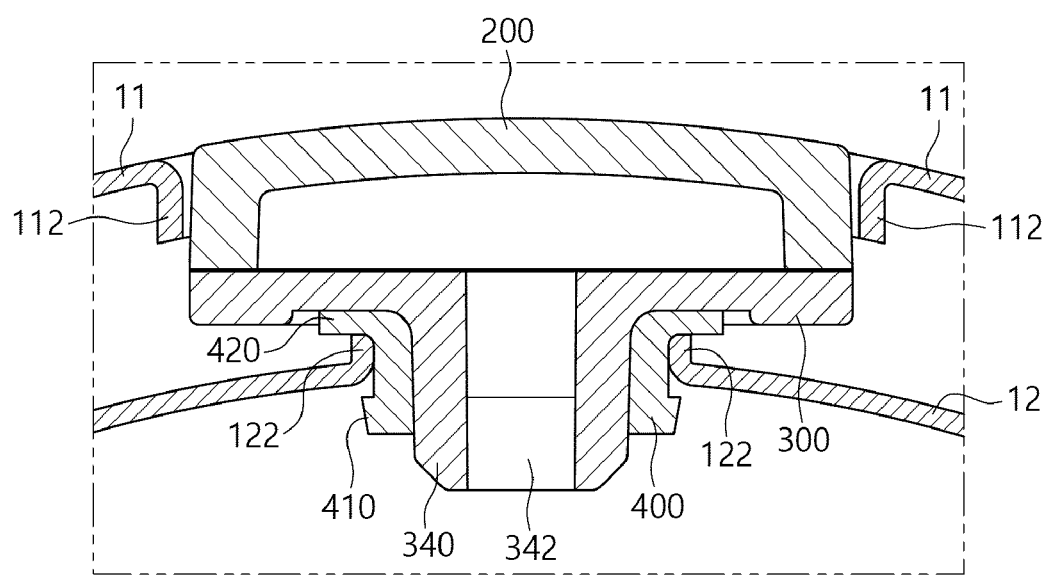
FIG. 9 is a partial top plan view illustrating a state in which the water level window is coupled to the main body constituting the electric kettle according to the embodiment of the present disclosure.
Figure 10:
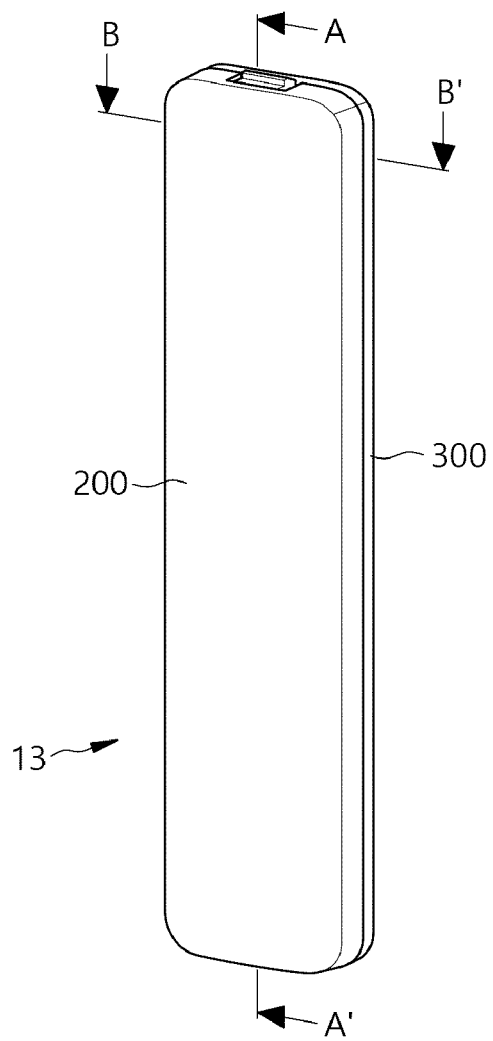
FIG. 10 is a perspective view illustrating the water level window constituting the electric kettle according to the embodiment of the present disclosure.
Figure 11:
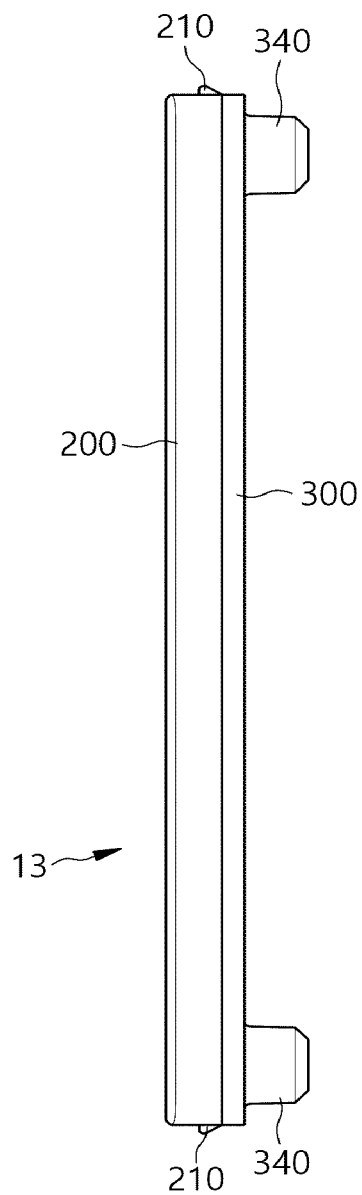
FIG. 11 is a side view illustrating the water level window constituting the electric kettle according to the embodiment of the present disclosure.
Figure 14:
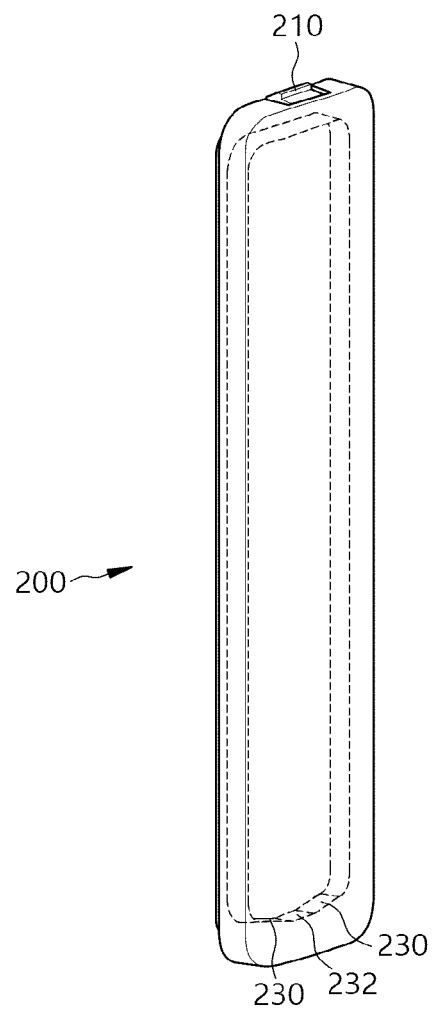
FIG. 14 is a perspective view illustrating an outer cover of the water level window constituting the electric kettle according to the embodiment of the present disclosure.
Figure 15:
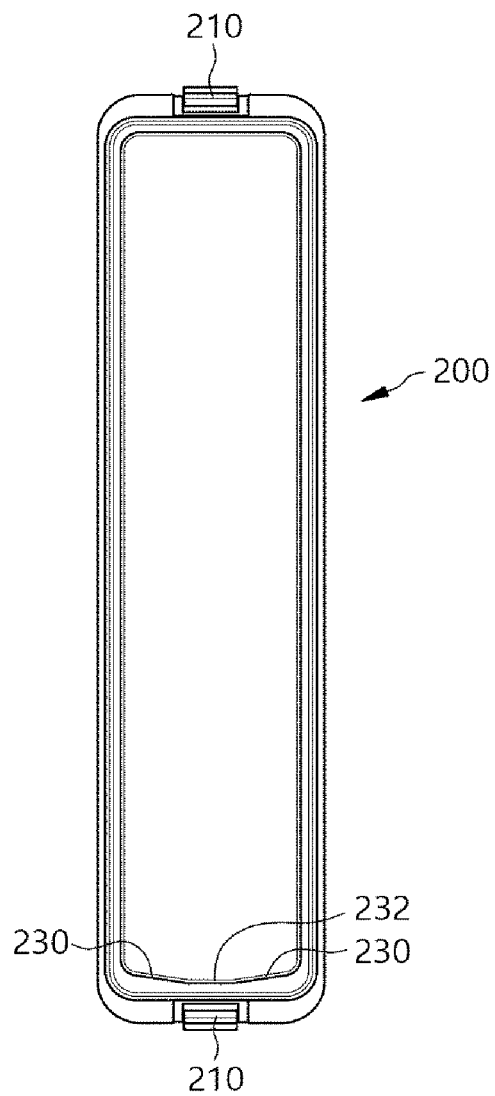
FIG. 15 is a rear view illustrating the outer cover of the water level window constituting the electric kettle according to the embodiment of the present disclosure.
Figure 16:
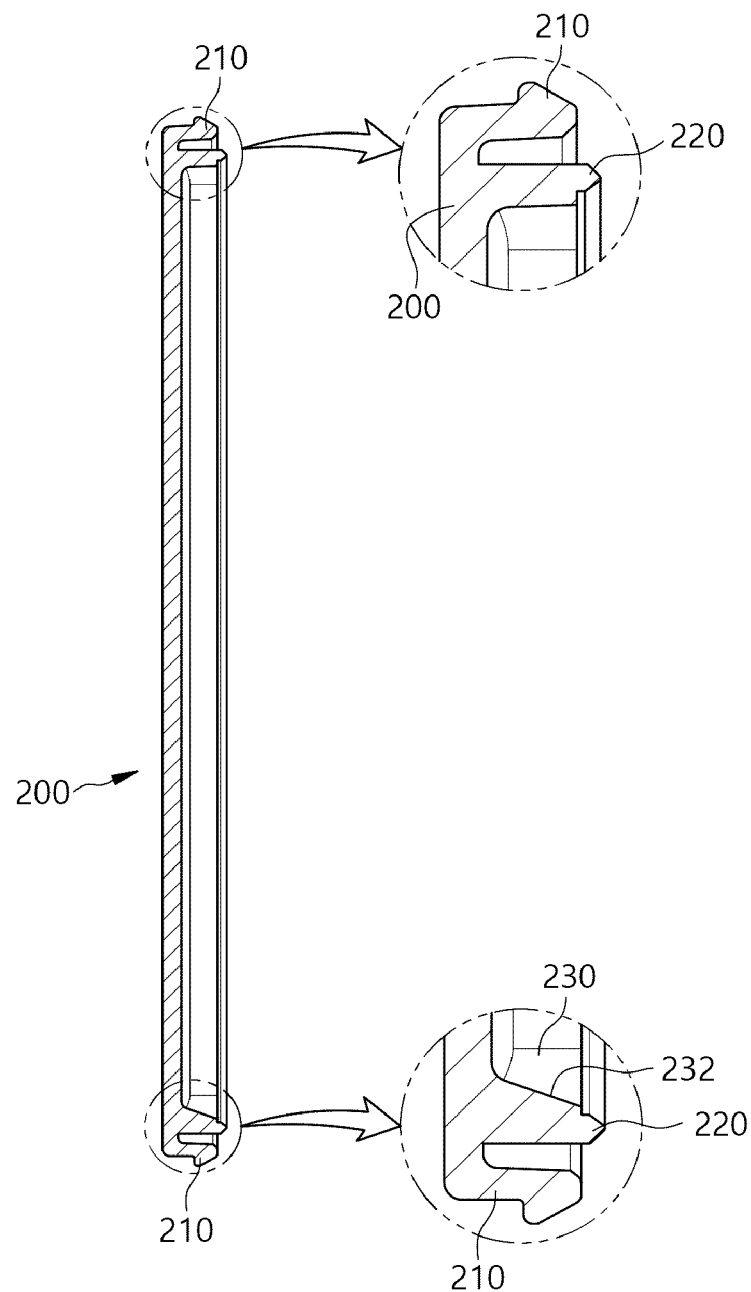
FIG. 16 is a vertical sectional view illustrating the outer cover of the water level window constituting the electric kettle according to the embodiment of the present disclosure.
Figure 17:
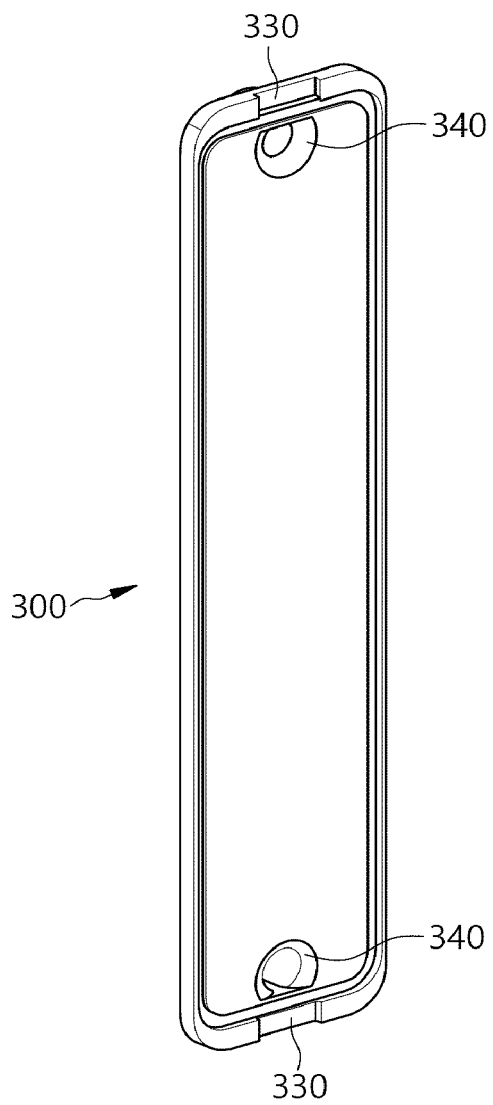
FIG. 17 is a perspective view illustrating an inner cover of the water level window constituting the electric kettle according to the embodiment of the present disclosure.
Figure 18:
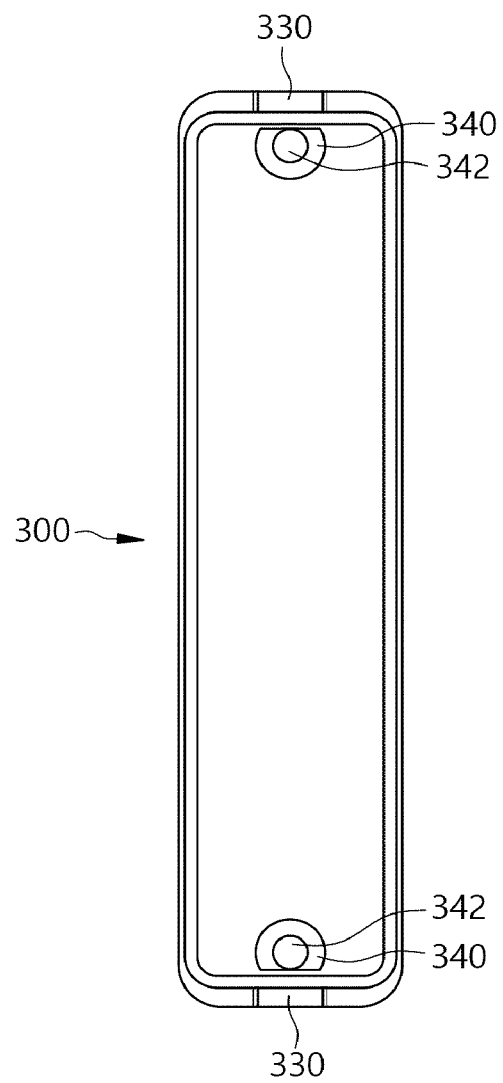
FIG. 18 is a front view illustrating the inner cover of the water level window constituting the electric kettle according to the embodiment of the present disclosure.
Figure 19:
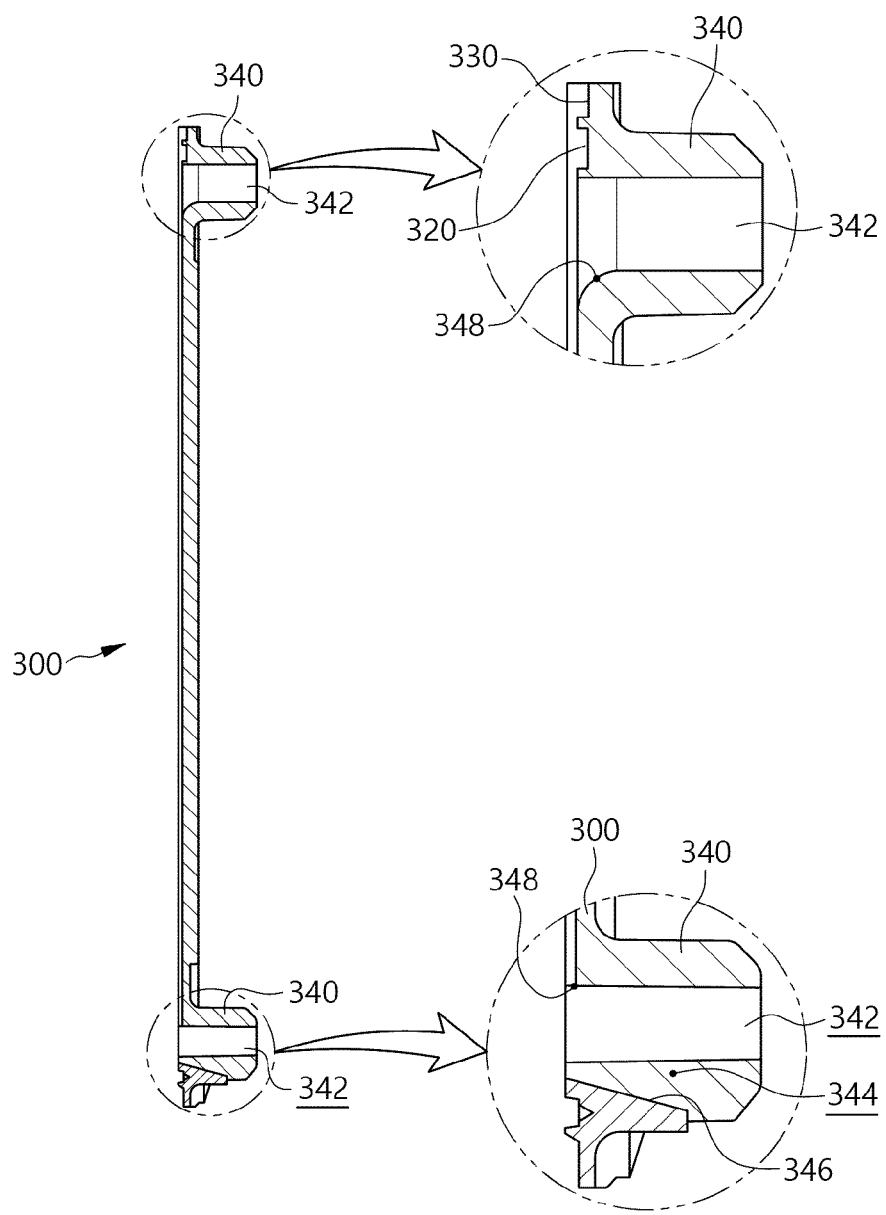
FIG. 19 is a vertical sectional view illustrating the inner cover of the water level window constituting the electric kettle according to the embodiment of the present disclosure.
Figure 20:
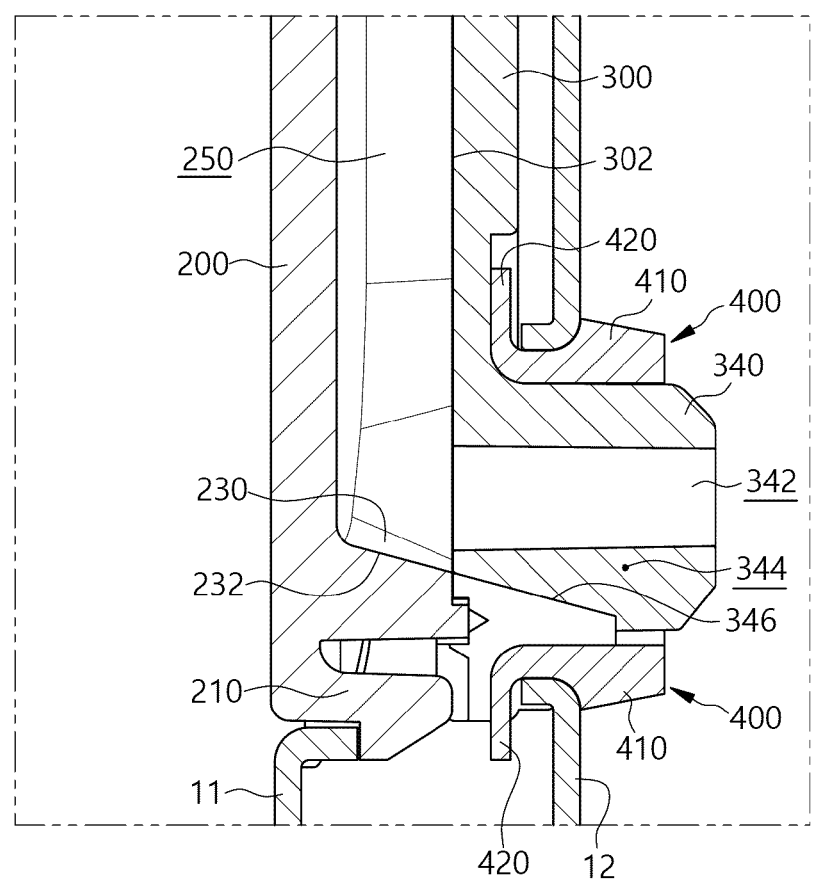
FIG. 20 is a partial front sectional view illustrating the coupled state of the lower end part of the water level window constituting the electric kettle according to the embodiment of the present disclosure.
Figure 21A:
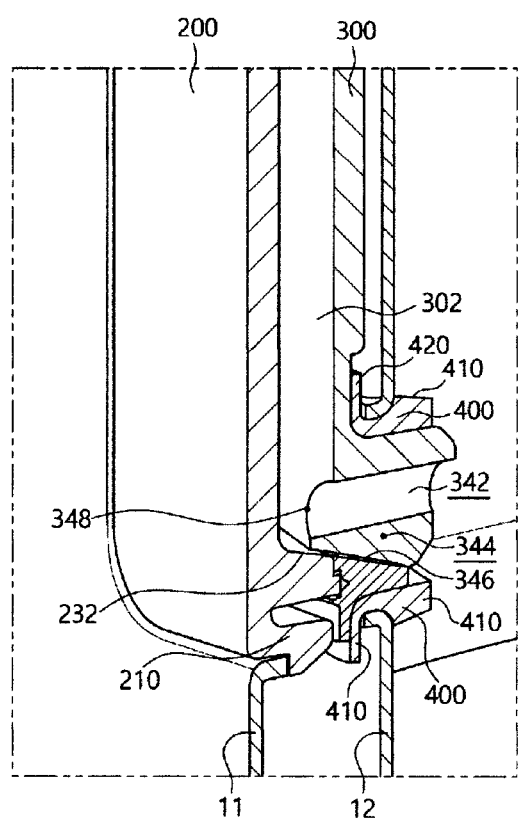
FIGS. 21A and 21B is a partial cut-away perspective view illustrating the coupled state of the lower end part of the water level window constituting the electric kettle according to the embodiment of the present disclosure.
Figure 21B:
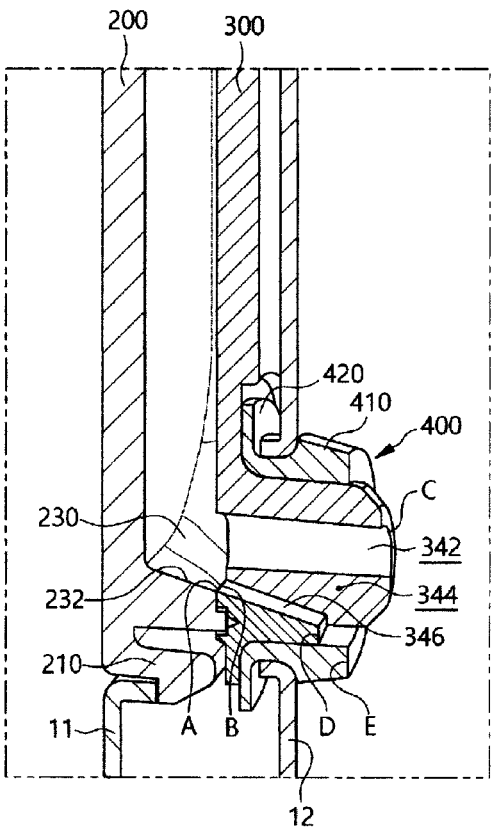

FIGS. 5 to 23 illustrate the configuration and installed state of the water level window 13. That is, FIGS. 5 and 6 respectively illustrate perspective views illustrating a state in which the water level window 13 and a packing 400 are removed from the main body 10, and FIG. 7 illustrates a cut-away perspective view of the main body 10. FIGS. 8 and 9 respectively illustrate a vertical sectional view and a partial top plan view illustrating a state in which the water level window 13 is coupled to the main body 10, and FIGS. 10 to 13 respectively illustrate the perspective view, side view, and sectional view of the configuration of the water level window 13. FIGS. 14 to 16 illustrate the configuration of an outer cover 200 constituting the water level window 13, and FIGS. 17 to 19 illustrate the configuration of an inner cover 300 of the water level window 13. FIGS. 20 and 21A and 21B respectively illustrate a partial front sectional view and a partial cut-away perspective view illustrating the coupled state of the lower end part of the water level window 13, and FIGS. 22 and 23 respectively illustrate the perspective view and cut-away perspective view of the packing 400 constituting the electric kettle according to the embodiment of the present disclosure.

As illustrated in these drawings, the water level window 13 may be provided in the main body 10 such that a user can see the height of content contained in the main body 10 from the outside of the main body 10, and it is preferable that at least the outer surface of the water level window 13 is made to be transparent.

The main body 10 may be configured as a double structure which includes the inner body 12 constituting an inner appearance thereof and the outer body 11 constituting an outer appearance thereof, and the water level window 13 may be coupled to the outer body 11 and the inner body 12.

At least one hole may be formed in the main body 10 such that the water level window 13 is received in or coupled to the hole. Specifically, an outer hole 110 to which the outer cover 200 constituting the water level window 13 is received to be coupled may be formed in the outer body 11, and a pair of inner holes 120 to which the ends of the inner cover 300 constituting the water level window 13 are inserted into and coupled may be formed respectively on the upper and lower parts of the inner body 12 such that the pair of inner holes 120 are spaced vertically apart from each other.

As illustrated in FIG. 7, the outer hole 110 and the inner hole 120 may be formed laterally through the side surfaces of the outer body 11 and the inner body 12, respectively, wherein the inner hole 120 may be a part in which a coupling end 340 and the packing 400 of the inner cover 300 to be described below are received.

The water level window 13 may be composed of the inner cover 300 made to be opaque and coupled to the inner body 12, and the outer cover 200 made to be transparent and coupled to the outer body 11.

Figure 6:
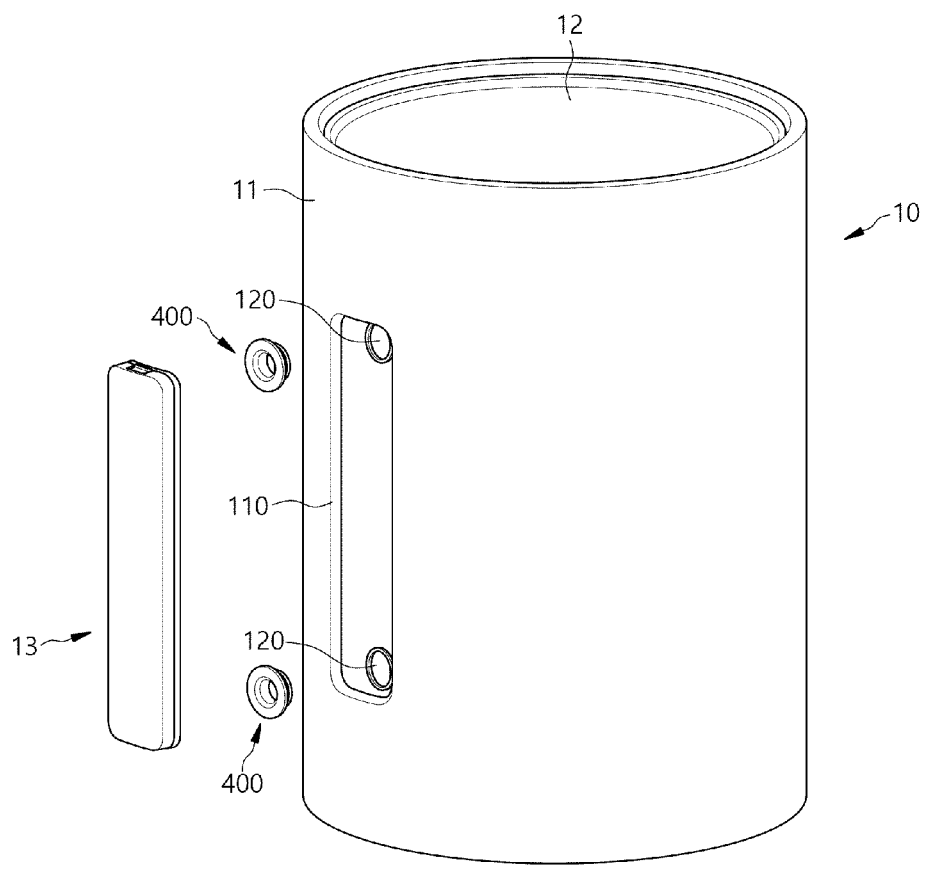
FIG. 6 is a perspective view illustrating a state in which the water level window and a packing are removed from the main body constituting the electric kettle according to the embodiment of the present disclosure.

As illustrated in FIG. 6, the water level window 13 may be formed in the shape of a rectangular plate and may be provided on the side surface of the main body 10.

The water level window 13 may be made of a tritan material. The entirety of the water level window 13 may be made of a tritan material, but only one of the inner cover 300 and the outer cover 200 may be made of a tritan material. Tritan is an eco-friendly material that utilizes the advantages of glass and plastic and thus is used even in a baby bottle.

The flow path 250 in which a fluid can flow may be formed between the inner cover 300 and the outer cover 200. A predetermined space may be defined between the inner sides of the inner cover 300 and the outer cover 200 having rectangular shapes. Such a space may be the flow path 250 in which a fluid can flow. Furthermore, the bottom surface of the flow path 250 may be formed to be inclined.

The inner cover 300 and the outer cover 200 configured to have shapes corresponding to each other may be coupled to each other by fusion. The edges of the inner cover 300 and the outer cover 200 facing each other may be in close contact with each other to be fixed to each other by fusion so as to constitute one water level window 13.

The outer cover 200 may include a cover hook 210 formed integrally thereon such that the water level window 13 is held in the main body 10 so as not to be removed therefrom. As illustrated in FIG. 8, a pair of cover hooks 210 having hook shapes may be formed respectively on the upper and lower ends of the outer cover 200 having rectangular plate shape.

The cover hook 210 may be a part held on the edge of the outer hole 110 of the outer body 11. More specifically, the outer hole 110 may be configured to have a rectangular shape corresponding to the size of the outer cover 200, and the edge of such an outer hole 110 may bend toward the inside of the outer body 11 to constitute an outer edge 112.

The outer edge 112 may be configured to have a predetermined size and may be formed by burring. Accordingly, when the outer edge 112 is burred to protrude to the inside of the outer body 11 instead of protruding to the outside of the outer body 11, the outer cover 200 mounted to the outer hole 110 may not protrude to the outside of the outer body 11.

As illustrated in the drawing, the cover hook 210 may be formed on each of the upper and lower ends of the outer cover 200, and may be formed on the side surface the outer cover 200 when required.

The inner cover 300 and the outer cover 200 may respectively include a fusion groove 320 and a fusion part 220 configured to have shapes corresponding to each other to be coupled to each other.

Figure 12:
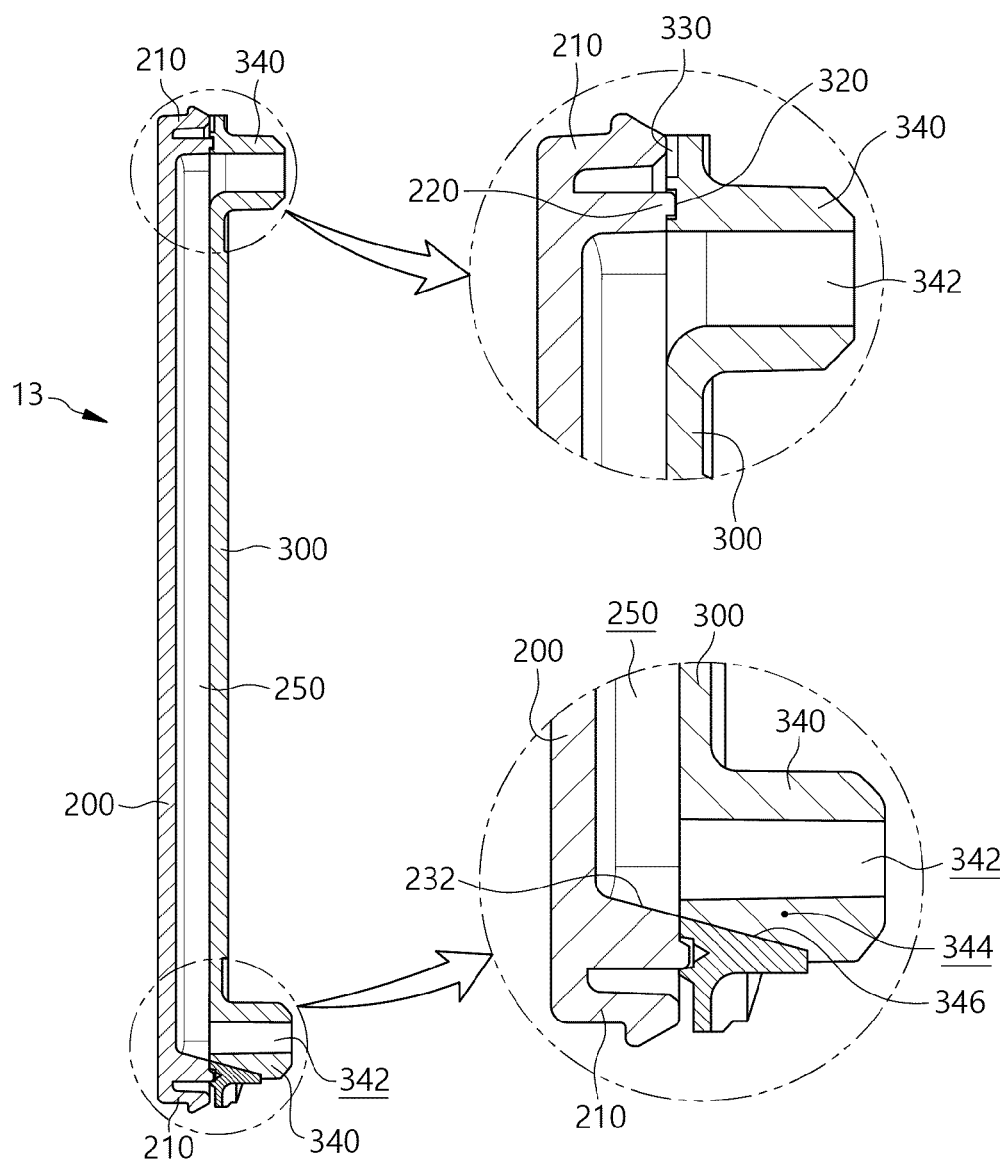
FIG. 12 is a sectional view taken along line A-A' of FIG. 10.
Figure 13:
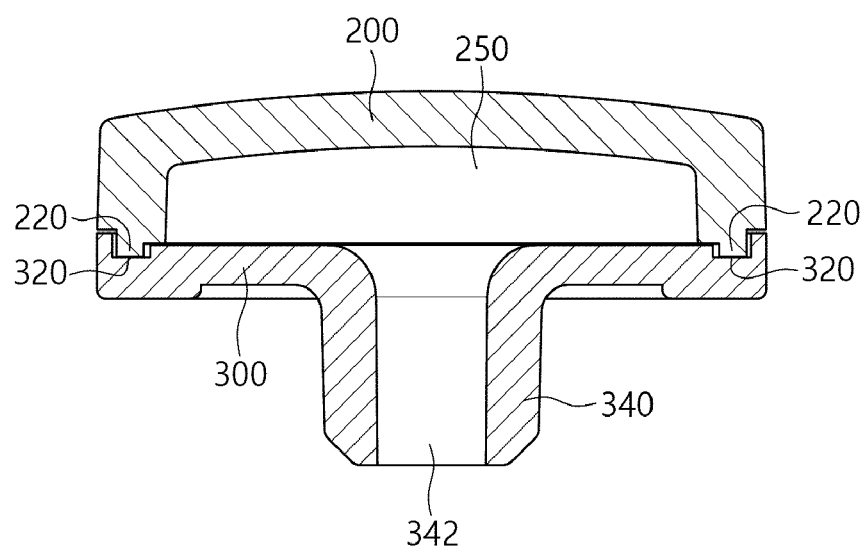
FIG. 13 is a cross-sectional view taken along line B-B' of FIG. 10.

As illustrated in FIGS. 12 and 16, the fusion part 220 may be formed on the rear end (a right end in FIGS. 12 and 16) of the edge of the outer cover 200 by protruding toward the rear side (a right side in FIGS. 12 and 16) of the outer cover 200, and the fusion groove 320 may be formed in the edge of the front surface (a left surface in FIGS. 12 and 19) of the inner cover 300 by being recessed therefrom toward the rear side (a right side in FIGS. 12 and 19) of the inner cover 300 such that the fusion part 220 is received in the fusion groove 320.

When the fusion part 220 and the fusion groove 320 are fused to each other, the inner cover 300 and the outer cover 200 may be coupled to each other, and the fusion part 220 and the fusion groove 320 may be configured to have shapes corresponding to each other and may function to guide the coupling of the inner cover 300 to the outer cover 200 at a precise position.

Opposite inclined surfaces 230 configured to guide the flow of a fluid may be formed on the bottom surface of the inside of the water level window 13. That is, the bottom surface of the flow path 250 formed inside the water level window 13 is preferably formed slantingly to guide the fluid of the inside of the flow path 250 such that the fluid is easily restored to the main body 10.

Specifically, the opposite inclined surfaces 230 symmetrical to each other left and right (in FIG. 15) may be formed on the bottom surface of the outer cover 200 and may guide fluids located at left and right sides to gather in the center of the bottom surface. Furthermore, an outer inclined surface 232 may be formed in the center of the pair of opposite inclined surfaces 230 and may guide the restoration of the fluids guided through the opposite inclined surfaces 230 to the main body 10 by gathering the fluids in the center of the opposite inclined surfaces 230.

The bottom surface of the flow path 250 may be configured to be inclined downward relative to the main body 10. That is, the bottom surface of the flow path 250 is preferably configured to be inclined to have height decreasing gradually in a direction toward the main body 10 (toward a right side in FIG. 16).

Specifically, it is preferably that the outer inclined surface 232 of the bottom surface of the outer cover 200 has a predetermined inclination toward the inside of the main body 10. That is, the outer inclined surface 232 is preferably configured to have a predetermined inclination in a direction toward the inside of the main body 10 (in a right direction in FIG. 16). Accordingly, when the outer inclined surface 232 of the bottom surface is configured to be inclined, a fluid inside the flow path 250 may be guided to easily flow to the inside of the main body 10.

The inner cover 300 may be a part coupled to the inner body 12 and is preferably made to be opaque. The reason in which the inner cover 300 is made to be opaque is for the inner hole 120 and an inner edge 122 to be described below to be invisible from the outside of the main body 10 through the outer cover 200.

A hook groove 330 may be formed in the edge end of the front surface (a left surface in FIGS. 12 and 19) of the inner cover 300 by being recessed therefrom toward the rear side of the inner cover 300 (a right side in FIGS. 12 and 19). The hook groove 330 may be a part which allows the cover hook 210 of the outer cover 200 not to interfere with the inner cover 300.

The inner hole 120 and the coupling end 340 may be formed in the inner body 12 and the inner cover 300, respectively, such that the inner hole 120 and the coupling end 340 are configured to have shapes corresponding to each other to be coupled to each other, each of the inner hole 120 and the coupling end 340 including a plurality of inner holes and coupling ends such that the inner holes 120 are spaced vertically apart from each other and the coupling ends 340 are spaced vertically apart from each other.

In the embodiment of the present disclosure, a pair of inner holes 120 may be formed respectively through the upper and lower parts of the inner body 12, and a pair of coupling ends 340 may be formed respectively on the upper and lower ends of the inner cover 300 by protruding therefrom to sides thereof.

The pair of inner hole 120 and coupling end 340 may be formed at a position corresponding to each other to be coupled to each other.

As illustrated in the drawing, the coupling end 340 may be formed by protruding from each of the upper and lower ends of the rear surface of the inner cover 300 toward the rear side (a right side in FIGS. 12 and 19) of the inner cover 300, and preferably has the shape of a hollow pipe.

The water level window 13 may be provided with an entrance flow path 342 formed in each of upper and lower end parts thereof, the entrance flow path 342 connecting the flow path 250 of the inside of the water level window 13 with the inside of the main body 10.

Specifically, the entrance flow path 342 having a predetermined size may be formed inside the coupling end 340, and a fluid contained inside the main body 10 may flow through the entrance flow path 342. That is, the entrance flow path 342 formed inside the coupling end 340 may be a path which connects the flow path 250 formed in the water level window 13 with the inside of the main body 10.

Meanwhile, the coupling end 340 may be inserted into and mounted to the inner hole 120 of the inner body 12 such that the coupling end 340 passes through the inner hole 120, and the inner edge 122 protruding in a direction toward the outside of the inner body 12 may be formed on the edge of the inner hole 120 such that the inner edge 122 has a predetermined size.

The inner edge 122 may be a part formed to have a predetermined size by bending outward from the outer surface of the inner body 12, and may be formed by burring the inner hole 120.

When the inner edge 122 is burred to protrude toward the outside of the inner body 12, the coupling end 340 and the packing 400 inserted into the inner hole 120 may protrude in a relatively small degree toward the inside of the inner body 12. That is, the coupling end 340 and the packing 400 to be described below may be located at the outer side of the inner body 12, the amount of the coupling end 340 and the packing 400 protruding into the main body 10 may decrease.

When the coupling end 340 or the packing 400 protrudes into the main body 10, the coupling end 340 or the packing 400 may cause interference or may collide with food received in the main body 10 when a user uses the electric kettle.

Accordingly, the reason in which the inner edge 122 is burred outward is to prevent the coupling end 340 and the packing 400 from protruding into the main body 10 so as to improve usability.

Meanwhile, the water level window 13 may be composed of a single part. That is, except for the assembly of the water level window 13 by coupling the inner cover 300 to the outer cover 200 as described above, the inner cover 300 and the outer cover 200 may be formed to be integrated with each other by injection molding.

Accordingly, when the water level window 13 is formed integrally, the inner part corresponding to the inner cover 300 and the outer part corresponding to the outer cover 200 may be formed to be integrated with each other, and the flow path 250 may be formed between the inner part and the outer part. That is, the water level window 13 may be composed of the inner part and the outer part integrated with each other, and the flow path 250 may be formed between the inner part and the outer part.

Furthermore, the entrance flow path 342 may be formed in each of the upper and lower parts of the water level window 13, the entrance flow path 342 connecting the flow path 250 formed inside the water level window 13 with the inside of the main body 10.

An entrance flow path groove 344 may be formed in the lower end of the inner cover 300. That is, the entrance flow path groove 344 may be formed in the coupling end 340 of the lower part of the inner cover 300 by being depressed therefrom.

More specifically, the lower end portion of the center of the entrance flow path 342 formed in a cylindrical shape on the lower end part of the inner cover 300 may be depressed to form the entrance flow path groove 344, and such an entrance flow path groove 344 is preferably formed to be inclined toward a side. That is, as illustrated in FIG. 19, the entrance flow path groove 344 is preferably formed slantingly to have depth increasing gradually toward the inside (a right side in FIG. 19) of the main body 10. Accordingly, the lower surface of the entrance flow path groove 344 may constitute an inner inclined surface 346 lowering gradually toward the inside (a right side in FIG. 19) of the main body 10.

The inner inclined surface 346 of the entrance flow path groove 344 is preferably configured to correspond to the inclination of the outer inclined surface 232 formed on the lower end part of the outer cover 200. Accordingly, the right end A (in FIG. 12) of the outer inclined surface 232 of the outer cover 200 and the left end B (in FIG. 12) of the inner inclined surface 346 of the inner cover 300 may be in contact with each other at the same height such that a fluid of the flow path 250 is guided into the main body 10.

Accordingly, the bottom surface of the entrance flow path 342 formed in the lower end part of the water level window 13 may be configured to be inclined. To this end, the inner inclined surface 346 and the outer inclined surface 232 may be formed in the inner cover 300 and the outer cover 200, respectively, so as to guide the flow of a fluid contained inside the flow path 250 to the main body 10. Furthermore, the inner inclined surface 346 and the outer inclined surface 232 may be configured to have the same inclinations, and it is preferable that the corresponding ends of the inner inclined surface 346 and the outer inclined surface 232 are in close contact with each other to have the same heights. That is, as illustrated in FIG. 12, the left end B of the inner inclined surface 346 of the inner cover 300 and the right end A of the outer inclined surface 232 of the outer cover 200 are preferably installed in close contact with each other to have the same heights. Of course, the left end B of the inner inclined surface 346 of the inner cover 300 may be formed to have height lower than the height of the right end A of the outer inclined surface 232 of the outer cover 200.

Accordingly, due to the outer inclined surface 232 which is the lower end part of the outer cover 200 constituting the flow path 250, the entrance flow path groove 344, and the inner inclined surface 346, water or food contained in the flow path 250 may be introduced into the main body 10. That is, when the electric kettle 1 of the present disclosure is placed upright after being used, the flow path 250 is perpendicular to the ground, and the entrance flow path 342 is horizontal to the ground. In this case, water remained in the flow path 250 may be naturally introduced into the main body 10 along the outer inclined surface 232 and the inner inclined surface 346, so no foreign matter such as water may remain inside the flow path 250.

The inner body 12 may be further provided with the packing 400 blocking a gap between the inner cover 300 and the inner body 12.

The packing 400 may have a center portion formed to have a cylindrical shape corresponding to the inner hole 120 and is preferably made of an elastic material. The packing 400 may be inserted into the inner hole 120 and may function to maintain airtightness of a gap between the coupling end 340 and the inner hole 120.

The packing 400 may have a packing hook part 410 and a packing holding end 420 formed respectively on opposite ends thereof such that the packing hook part 410 is located inside the inner body 12 and the packing holding end 420 is located outside the inner body 12.

The packing hook part 410 may have a tapered shape having an outer diameter decreasing gradually toward a second end of the packing hook part 410 from a first end thereof, wherein it is preferably that the first end of the packing hook part 410 is configured to have an outer diameter larger than the inner diameter of the inner hole 120, and the second end of the packing hook part 410 is configured to have an outer diameter smaller than the inner diameter of the inner hole 120.

The packing 400 may be inserted into the inner hole 120 from the outside of the inner body 12 to be held therein. Accordingly, when the packing 400 made of an elastic material is pushed into the inner hole 120 from the outside of the inner body 12, the packing 400 is required to be pushed and held therein.

Figure 22:
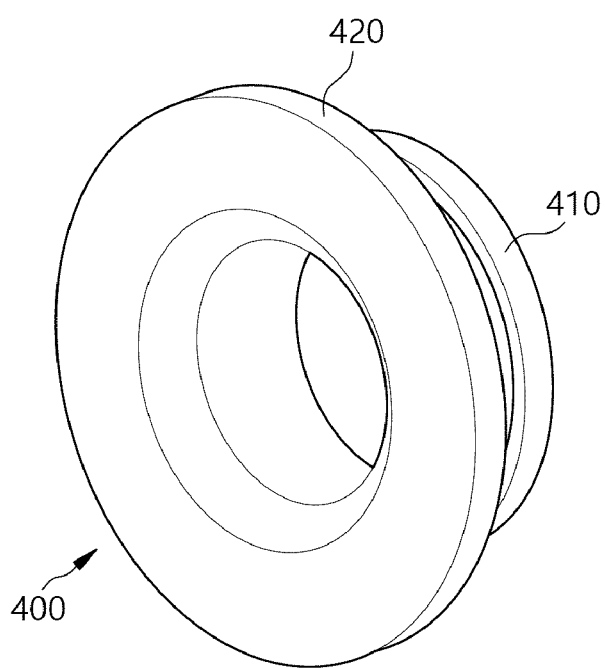
FIG. 22 is a perspective view of the packing constituting the electric kettle according to the embodiment of the present disclosure.
Figure 23:
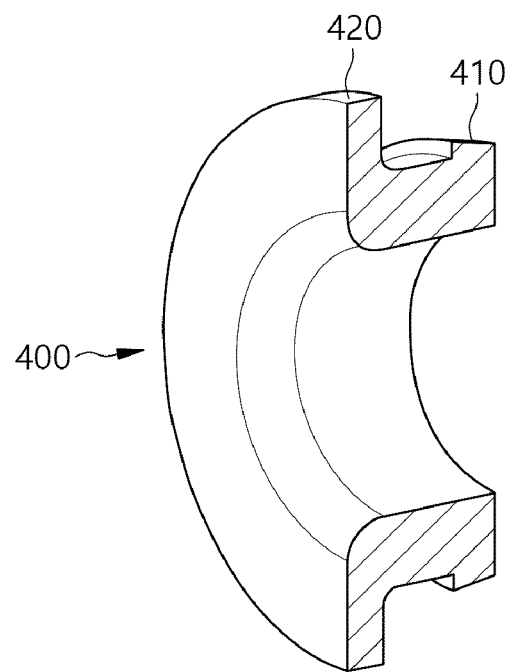
FIG. 23 is a cut-away perspective view of the packing constituting the electric kettle according to the embodiment of the present disclosure.

Accordingly, the packing hook part 410 may be formed on the rear end (a right end in FIGS. 22 and 23) of the packing 400, and such a packing hook part 410 may be configured to have an outer diameter decreasing gradually toward the rear side thereof (the right side in FIGS. 22 and 23).

Furthermore, the outer diameter of the rear end (a right end in FIGS. 22 and 23) of the packing hook part 410 is preferably smaller in size than the inner diameter of each of the inner hole 120 and the inner edge 122, and the outer diameter of the front end (a left end in FIGS. 22 and 23) of the packing hook part 410 is preferably larger in size than the inner diameter of each of the inner hole 120 and the inner edge 122. In this case, after the packing 400 is inserted into the inner hole 120, the packing 400 may not be removed to the outside of the inner body 12 due to the packing hook part 410.

As illustrated in FIG. 22, the packing holding end 420 may extend by bending perpendicularly outward from the front end of the packing 400 and may have a circular ring shape.

The outer diameter of the packing holding end 420 is preferably larger than the inner diameter of each of the packing hook part 410, the inner hole 120, and the inner edge 122. This is to prevent the packing 400 from being pushed into the inner body 12 after the packing 400 is inserted into the inner hole 120 from the outside of the inner body 12.

The water level window 13 may be mounted to the main body 10 by being press-fitted from the outside of the main body 10. Accordingly, the rear end part (the right end in FIGS. 12 and 19) of the coupling end 340 of the inner cover 300 is preferably configured to have an outer diameter decreasing gradually toward the rear side (a right side in FIGS. 12 and 19). Furthermore, the outer diameter of the end of the rear end part (the right end in FIGS. 12 and 19) of the coupling end 340 of the inner cover 300 is preferably smaller than the inner diameter of the packing 400.

In this case, in a state in which the packing 400 is mounted into the inner hole 120 of the inner body 12, when the coupling end 340 of the water level window 13 is pushed into the inner hole 120 from the outside of the main body 10, the coupling end 340 may be naturally inserted into the packing 400 such that the water level window 13 is coupled to the main body 10.

Meanwhile, as described above, the entrance flow path 342 is preferably formed in each of the upper and lower end parts of the inner cover 300 and may be formed to be perpendicular to the flow path 250. That is, the corner angle 348 formed between the surface of the entrance flow path 342 and the outer surface of the inner cover 300 may be configured to be 9zero degrees.

In addition, the corner angle 348 formed between the surface of the flow path 250 and the surface of the entrance flow path 342 may be configured to have the curvature of zero degrees. That is, the corner angle 348 formed between the surface of the entrance flow path 342 and the outer surface (an inside surface 302) of the inner cover 300 may be configured to have the curvature R of zero degrees. More specifically, the corner angle 348 formed between the surface of the entrance flow path 342 formed in the upper end part of the inner cover 300 and the outer surface of the inner cover 300 may have a curvature larger than the curvature R of zero degrees, and the corner angle 348 formed between the surface of the entrance flow path 342 formed in the lower end part of the inner cover 300 and the outer surface of the inner cover 300 may be configured to have the curvature R of zero degrees. That is, the corner angle 348 formed between the surface of the entrance flow path 342 formed in the lower end part of the inner cover 300 and the inside surface 302 of the inner cover 300 is preferably configured to have the curvature R of zero degrees.

Accordingly, the reason in which the corner angle 348 formed between the surface of the entrance flow path 342 formed in the lower end part of the inner cover 300 and the inside surface 302 of the inner cover 300 has the curvature of zero degrees is to minimize a fluid remaining in the flow path 250 or the entrance flow path 342. That is, when the corner angle 348 formed between the surface of the entrance flow path 342 formed in the lower end part of the inner cover 300 and the inside surface 302 of the inner cover 300 has a predetermined curvature R, a fluid such as water may be attached to and remain in such a corner portion. Accordingly, the corner angle 348 formed between the surface of the entrance flow path 342 formed in the lower end part of the inner cover 300 and the inside surface 302 of the inner cover 300 may have the curvature of zero degrees such that all fluids remaining inside the flow path 250 and the entrance flow path 342 are restored into the main body 10 as much as possible after discharging fluids contained in the electric kettle to the outside by tilting the electric kettle.

The length of the entrance flow path groove 344 is preferably shorter than the length of the entrance flow path 342 formed in the lower end part of the water level window 13. Accordingly, as illustrated in FIGS. 20 and 21, the inner end (a right end in FIGS. 20 and 21) of the entrance flow path groove 344 or the inner inclined surface 346 is preferably located at a side outer (a left side in FIGS. 20 and 21) than the inner end (a right end in FIGS. 20 and 21) of the inner cover 300.

Furthermore, as described above, the packing 400 may be provided to block a gap between the inner cover 300 and the main body 10, wherein the inner end C (a right end in FIGS. 20 and 21) of such a packing 400 preferably protrudes more into the main body 10 than the inner end E of the entrance flow path groove 344 or the inner end D of the inner inclined surface 346. That is, the inner end E (a right end in FIGS. 20 and 21) of the entrance flow path groove 344 is preferably located at a side outer (a left side in FIGS. 20 and 21) than the inner end C (the right end in FIGS. 20 and 21) of the packing 400, and further, a portion of the right side of the inner inclined surface 346 may be cut such that the inner end D of the inner inclined surface 346 is shorter than the inner end E of the entrance flow path groove 344.

In this case, a surface stress of the entrance flow path 342 may be distributed such that the formation of water droplets in the entrance flow path 342 formed in the lower end part of the water level window 13 is minimized. That is, the right end E of the lower end of the inner cover 300 may be partially cut such that the length of the entrance flow path groove 344 formed in the lower end part of the inner cover 300 is short, and accordingly, due to the distribution of the surface stress of the entrance flow path 342 of the lower end part of the inner cover 300, the formation of water droplets may decrease.

In addition, a portion of a right side of the inner inclined surface 346 may be cut such that the inner end D of the inner inclined surface 346 is shorter than the inner end E of the entrance flow path groove 344, so as a whole, the formation of water droplets in the entrance flow path groove 344 due to a surface stress thereof may be minimized.

Hereinafter, the operation of the electric kettle of the present disclosure having the above-described configuration will be described with reference to the accompanying drawings.

First, in order to use the electric kettle 1 of the present disclosure, a user plugs a power cable (not shown) connected to the base 60 into an outlet such that the electric kettle is supplied with power.

In this state, water or contents may be put in the heating space 101 of the inside of the main body 10, and the main body 10 may be seated on the base 60.

When the main body 10 is seated on the base 60, the upper power module 55 and the lower power module 64 may be in contact with each other such that power can be supplied to the main body 10 from the base 60.

Next, a user may operate the heater 54 by manipulating the push bottom of the handle 40 such that water received in the heating space 101 is heated. That is, a user may control the operation of the heater 54 by a manipulation button so as to heat water or food received in the main body 10 or to stop the heating thereof.

The heater 54 may be operated by such a manipulation, and water received in the heating space 101 may be heated by the heating of the heater 54.

When the temperature sensor 53 detects that water contained inside the heating space 101 reaches a predetermined temperature, the operation of the heater 54 may stop and the use of the electric kettle 1 may be completed.

When the operation of the electric kettle 1 is completed, a user may raise the main body 10 by holding the handle 40 such that the main body 10 is removed from the base 60, and may pour the heated water through the spout 30 by tilting the electric kettle 1.

In the electric kettle 1, in a state in which the heating of water is completed, heat conduction may be reduced or blocked due to the double structure of the main body 10. Accordingly, even if a user contacts the outer surface of the main body 10, the outer surface of the main body 10 may not feel excessively hot, thereby securing safety in use, and even while the heater 54 does not operate, the temperature of heated water may be maintained for a long time.

Meanwhile, the water level window 13 may be mounted to the main body 10, and the assembly sequence of the water level window 13 will be described.

As described above, the water level window 13 may be composed of the outer cover 200 and the inner cover 300. Accordingly, the outer cover 200 and the inner cover 300 may be coupled to each other by fusion to constitute one water level window 13.

First, the inner cover 300 and the outer cover 200 may be approached to each other such that the fusion part 220 of the outer cover 200 is received in and fused to the fusion groove 320 of the inner cover 300. In this case, the outer cover 200 may be securely fixed to the inner cover 300 to constitute the water level window 13.

Furthermore, the packing 400 may be inserted into the inner hole 120 to be held thereto. That is, when the packing 400 is pushed into the inner hole 120 of the inner body 12 after approached to the inner hole 120 from the outside of the main body 10, the packing hook part 410 of the packing 400 may pass through the inner hole 120, and since the packing holding end 420 of the packing 400 has an outer diameter larger than the outer diameter of the inner hole 120, the packing holding end 420 of the packing 400 may not pass through the inner hole 120. This state is illustrated in FIG. 8.

Figure 5:
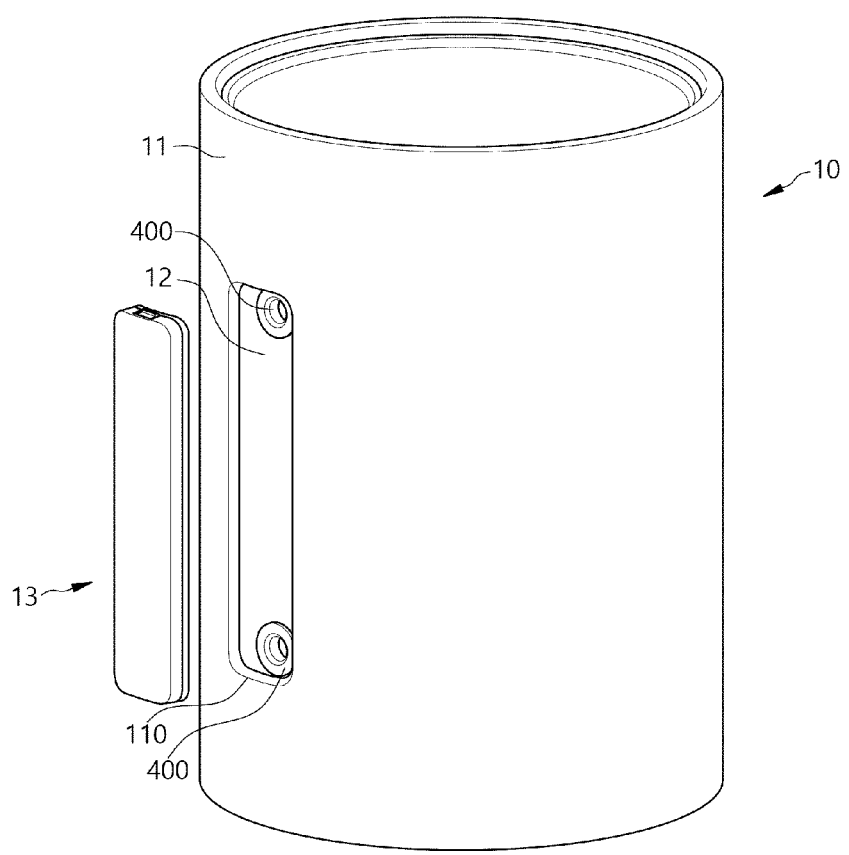
FIG. 5 is a perspective view illustrating a state in which a water level window is removed from a main body constituting the electric kettle according to the embodiment of the present disclosure.

Next, in the state of the water level window 13 in FIG. 5, the water level window 13 may be approached and pressed into the outer hole 110 of the main body 10. In this case, the coupling end 340 of the water level window 13 may pass through the packing 400 coupled to the inner body 12.

When the coupling end 340 of the water level window 13 passes through the packing 400, the cover hook 210 of the outer cover 200 may be held on the outer edge 112 of the outer hole 110 as illustrated in FIG. 8. Accordingly, while the water level window 13 is mounted to the main body 10, the water level window 13 may be prevented from being removed from the main body 10.

Of course, a distance between the cover hooks 210 of upper and lower ends of the outer cover 200 may be longer than a distance between the upper and lower ends of the outer hole 110, but each of the cover hooks 210 may be made to have elasticity due to a shape thereof. Accordingly, when a worker brings the water level window 13 into close contact with the main body 10, the cover hooks 210 may be pushed into the outer hole 110 due to the elasticity of the cover hooks 210 and may be held respectively to the outer edges 112 as illustrated in FIG. 8.

In addition, after a user pours heated water through the spout 30 by tilting the electric kettle 1 of the present disclosure, the electric kettle may be restored to an initial position thereof. In this case, the flow path 250 may be perpendicular to the ground. In this case, fluids inside the flow path 250 and the entrance flow path 342 may all be introduced into the main body 10. That is, when the height of a fluid contained inside the main body 10 is lower than the height of the flow path 250 or the entrance flow path 342, the fluids inside the flow path 250 and the entrance flow path 342 may all flow down into the main body 10 due to weights thereof since the bottom surface of each of the flow path 250 and the entrance flow path 342 is configured to be inclined downward in a direction toward the main body 10.

The scope of the present disclosure is not limited to the embodiment illustrated above, and many other modifications based on the present disclosure will be possible for those skilled in the art within the scope of the present disclosure.

What is claimed is:

1. An electric kettle comprising:
a main body to receive fluid therein and provided with a fluid level window through which a level of the fluid contained inside the main body is visible;
a lid for covering an open upper side of the main body; and
a base for supporting the main body at a lower side of the main body,
wherein a flow path in which the fluid flows is formed in the fluid level window and a bottom surface of the flow path has a downward inclination relative to the main body,
wherein an entrance flow path is formed in each of upper part and lower part of the fluid level window, the entrance flow path connecting the flow path inside the fluid level window to an inside of the main body, and a bottom surface of the entrance flow path formed in the lower part of the fluid level window is inclined,
wherein the entrance flow path at the lower part of the fluid level window having an end portion depressed to form an entrance flow path groove, the entrance flow path groove is slantingly inclined to have a depth gradually decreasing going toward the main body.

2. The electric kettle of claim 1, wherein the fluid level window comprises an inner cover and an outer cover having shapes corresponding to each other and coupled to each other, and the flow path is formed between the inner cover and the outer cover.

3. The electric kettle of claim 2, wherein an inner inclined surface and an outer inclined surface are formed on the inner cover and the outer cover, respectively, so as to guide the flow of the fluid contained in the flow path to the main body.

4. The electric kettle of claim 2, wherein the entrance flow path is perpendicular to the flow path.

5. The electric kettle of claim 2, wherein a corner angle formed between a surface of the flow path and a surface of the entrance flow path at the lower part of the fluid level window is angulated.

6. The electric kettle of claim 2, wherein a corner angle formed between a surface of the entrance flow path at the lower part of the fluid level window and an outer surface of the inner cover has a is angulated.

7. The electric kettle of claim 2, wherein a corner angle formed between a surface of an entrance flow path at an upper part of the inner cover and an outer surface of the inner cover has a curvature larger than a curvature of zero degrees, and
a corner angle formed between a surface of an entrance flow path at a lower part of the inner cover and an outer surface of the inner cover is angulated.

8. The electric kettle of claim 1, wherein the entrance flow path groove has a length shorter than a length of the entrance flow path at the lower part of the water level window.

9. The electric kettle of claim 8, wherein an inner end of the entrance flow path at the lower part of the fluid level window is located more inner toward the main body than an inner end of the entrance flow path groove.

10. The electric kettle of claim 8, further comprising:
a packing which blocks a gap between the inner cover and the main body.

11. The electric kettle of claim 10, wherein an inner end of the packing is located more inner toward the main body than an inner end of the entrance flow path groove.

12. The electric kettle of claim 1, wherein the fluid level window comprises an inner part and an outer part integrated with each other, and the flow path is formed between the inner part and the outer part.

13. The electric kettle of claim 12, wherein an entrance flow path is provided in each of upper part and lower part of the fluid level window, the entrance flow path connecting the flow path formed inside the fluid level window to an inside of the main body.

14. The electric kettle of claim 1, wherein the main body is a double structure such that the main body comprises an inner body constituting an inner appearance of the main body and an outer body constituting an outer appearance of the main body, and
the fluid level window comprises an inner cover that is opaque and coupled to the inner body, and an outer cover that is transparent and coupled to the outer body.

15. The electric kettle of claim 14, wherein the flow path in which the fluid flows is formed between the inner cover and the outer cover, and the inner cover and the outer cover are coupled to each other by fusion.

16. The electric kettle of claim 14, wherein the fluid level window is mounted to the main body by press-fitting thereto, and at least one of the inner cover or the outer cover is made of a tritan material.

* * * * *